United States Patent
Chun

(10) Patent No.: US 9,563,375 B2
(45) Date of Patent: Feb. 7, 2017

(54) METHOD FOR STORING METADATA OF LOG-STRUCTURED FILE SYSTEM FOR FLASH MEMORY

(71) Applicant: Electronics and Telecommunications Research Institute, Daejeon (KR)

(72) Inventor: Han Sung Chun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 14/609,058

(22) Filed: Jan. 29, 2015

(65) Prior Publication Data
US 2015/0254013 A1    Sep. 10, 2015

(30) Foreign Application Priority Data
Mar. 5, 2014  (KR) .................. 10-2014-0026166

(51) Int. Cl.
| G06F 12/00 | (2006.01) |
| G06F 3/06 | (2006.01) |
| G06F 13/00 | (2006.01) |
| G06F 13/28 | (2006.01) |

(52) U.S. Cl.
CPC ............ *G06F 3/0619* (2013.01); *G06F 3/064* (2013.01); *G06F 3/0679* (2013.01)

(58) Field of Classification Search
CPC ....... G06F 3/064; G06F 3/0679; G06F 3/0619
See application file for complete search history.

(56) References Cited

U.S. PATENT DOCUMENTS

| 8,898,388 B1* | 11/2014 | Kimmel .............. G06F 12/0802 711/103 |
| 9,043,555 B1* | 5/2015 | Khona .................. G06F 3/0683 711/118 |
| 2010/0199042 A1* | 8/2010 | Bates .................... H04L 67/289 711/114 |
| 2012/0166709 A1 | 6/2012 | Chun |
| 2013/0166828 A1 | 6/2013 | Chun |
| 2014/0115232 A1* | 4/2014 | Goss .................. G06F 11/1012 711/103 |
| 2014/0310483 A1* | 10/2014 | Bennett .................. G06F 12/00 711/154 |

FOREIGN PATENT DOCUMENTS

KR    10-2012-0072228 A    7/2012

OTHER PUBLICATIONS

Mendel Rosenblum et al., "The Design and Implementation of a Log-Structured File System," ACM Transactions on Computer Systems, Jul. 24, 1991, pp. 1-15.

* cited by examiner

*Primary Examiner* — Mark Giardino, Jr.

(57) ABSTRACT

Disclosed is a method for storing data of a log-structured file system (LFS), which does not separately store segment summary information (SS) and segment usage information (SU) but makes a checkpoint be included in a checkpoint record and written upon writing the checkpoint to improve write performance for a flash memory by decreasing the number of metadata to be written in a flash page.

18 Claims, 14 Drawing Sheets

Fig.1

| Segment 0 | | | | Segment 1 | | | | Segment 2 | | | |
|---|---|---|---|---|---|---|---|---|---|---|---|
| 0 | 1 | 2 | 3 | 4 | 5 | 6 | 7 | 8 | 9 | 10 | 11 |

Fig.2A

| INODE NUMBER | FILE BLOCK NUMBER |
|---|---|

Fig.2B

INDEX

| | INODE NUMBER | FILE BLOCK NUMBER |
|---|---|---|
| 0 | INODE NUMBER | FILE BLOCK NUMBER |
| 1 | INODE NUMBER | FILE BLOCK NUMBER |
| 2 | INODE NUMBER | FILE BLOCK NUMBER |
| ⋮ | | |
| N | INODE NUMBER | FILE BLOCK NUMBER |

Fig.3A

| NUMBER OF VALID BLOCKS IN SEGMENT | TIME WHEN INFORMATION IS LAST WRITTEN IN SEGMENT |
|---|---|

Fig.3B

INDEX

| | | |
|---|---|---|
| 0 | NUMBER OF VALID BLOCKS IN SEGMENT | TIME WHEN INFORMATION IS LAST WRITTEN IN SEGMENT |
| 1 | NUMBER OF VALID BLOCKS IN SEGMENT | TIME WHEN INFORMATION IS LAST WRITTEN IN SEGMENT |
| 2 | NUMBER OF VALID BLOCKS IN SEGMENT | TIME WHEN INFORMATION IS LAST WRITTEN IN SEGMENT |
| ⋮ | | |
| N | NUMBER OF VALID BLOCKS IN SEGMENT | TIME WHEN INFORMATION IS LAST WRITTEN IN SEGMENT |

Fig.4A

| CHECKPOINT INFORMATION | SS/SU RECORD LIST |
|---|---|

Fig.4B

| RECORD TYPE | BLOCK NUMBER | INODE NUMBER | FILE BLOCK NUMBER |
|---|---|---|---|

Fig.4C

| RECORD TYPE | SEGMENT NUMBER | NUMBER OF VALID BLOCKS IN SEGMENT | SEGMENT WRITE TIME |
|---|---|---|---|

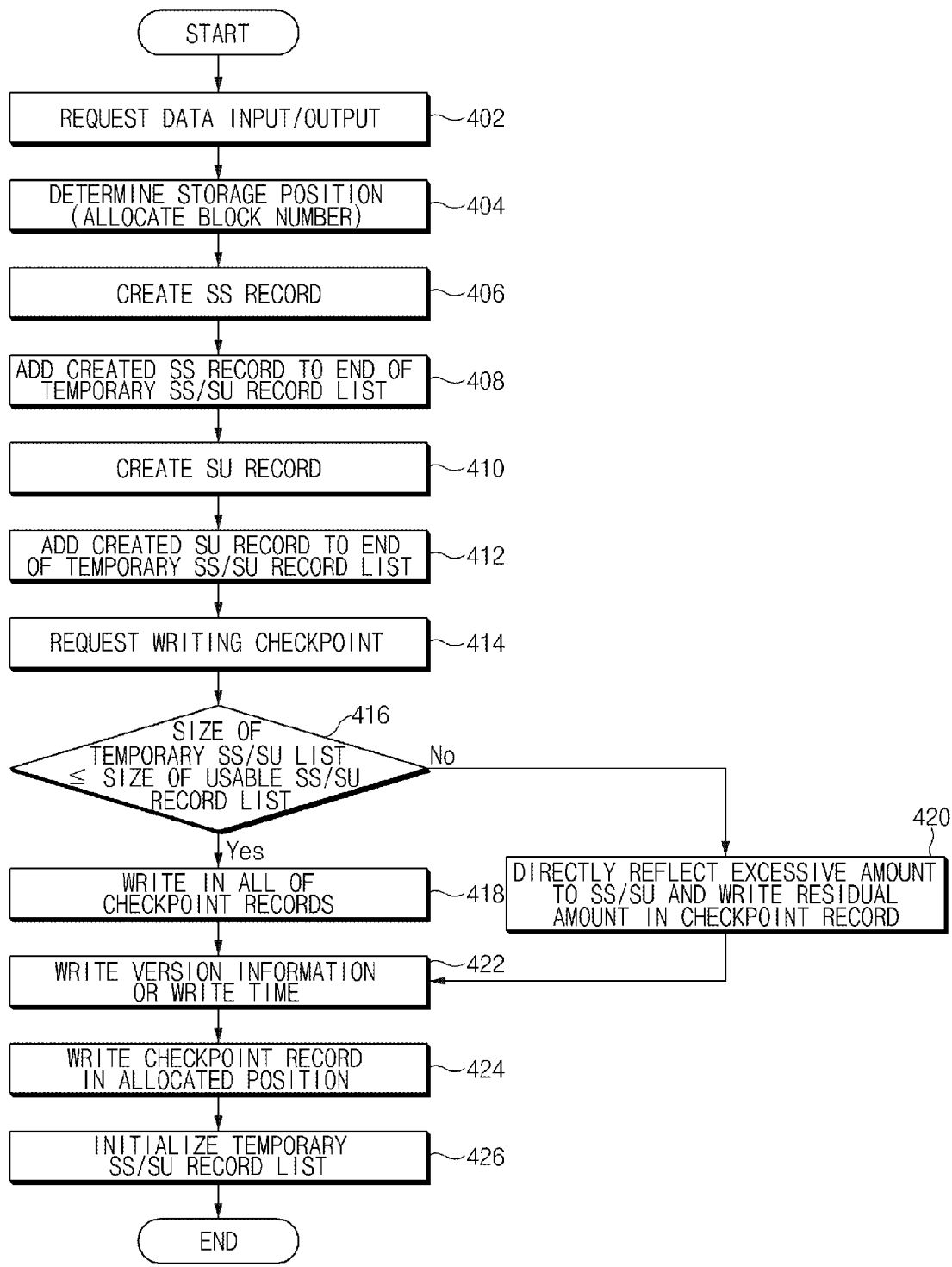

METHOD FOR STORING METADATA OF LOG-STRUCTURED FILE SYSTEM FOR FLASH MEMORY

CROSS-REFERENCE TO RELATED APPLICATIONS

This application claims priority to and the benefit of Korean Patent Application No. 10-2014-0026166 filed in the Korean Intellectual Property Office on Mar. 5, 2014, the entire contents of which are incorporated herein by reference.

TECHNICAL FIELD

The present invention relates to a method for storing data of a log-structured file system (LFS), and more particularly, to a method that can improve write performance for a flash memory by decreasing the number of metadata to be written in a flash page.

BACKGROUND ART

Since a flash memory is inexpensive, and is low in power consumption and has a small size, the flash memory is widely used as a storage device in various embedded systems.

In particular, a NAND flash memory which is one of types of the widely used flash memories is constituted by a plurality of erase blocks and each erase block is constituted by a plurality of pages. In the case of a large block NAND flash memory which has been increasingly used in recent years, the size of one page is 2 KB and 64 pages are gathered to constitute one erase block.

The flash memory is capable of performing three operations of Read, Write, and Erase. Read/Write is performed by the page and Write is called a program. In order to program a page which has been programmed once again, the entirety of an erase block to which the page belongs needs to be first erased and the Erase operation requires more time than Read/Write operations. Since each erase block is limited in the number of erasable times, when the number of erase times reaches a limit, the corresponding erase block cannot be used. An erase block which cannot be used any longer corresponds to a bad block. Therefore, a sufficient life-span of the flash memory can be ensured only when wear leveling that enables the respective erase blocks to be evenly used is achieved.

As such, the flash memory has a problem in which it takes a long time to rewrite data in a region in which data has been written once again and a problem in which when the block of the flash memory is gradually abraded with repeated usage to reach a limit, the block cannot be used. Accordingly, a scheme is presented, which solves such problems by processing data by performing a specific operation in a file system corresponding to an upper layer of the flash memory.

A representative file system used in the flash memory is a log-structured file system. The log-structured file system stores data in a scheme that sequentially writes both metadata and data of a file system in a log by regarding a storage space as one log.

The log-structured file system includes a sprite LFS in which the log-structured file system (LFS) is implemented in a sprite operating system, a flash-friendly file system (F2FS) in which a structure of the sprite LFS is improved to be suitable for being used for a flash translation layer (FTL) based flash storage device, a new implementation of a log-structured file system (NILFS2) that provides a snapshot function, and the like.

SUMMARY OF THE INVENTION

The present invention has been made in an effort to provide a method that can improve write performance of a file system by decreasing the number of write times required to make a file system be in a consistent state.

An exemplary embodiment of the present invention provides a method for storing, by a file system, metadata, the method including: allocating a block to be stored with information to be written; creating a segment summary information (SS) record for the allocated block to write the created SS record in a temporary list; creating a segment usage information (SU) record for a segment where blocks in which the segment summary information (SS) record is created are positioned to write the created SU record in the temporary list; making at least any one of the segment summary information record and the segment usage information (SU) record written in the temporary list be included in a checkpoint record; and writing the checkpoint record in an allocated position.

Another exemplary embodiment of the present invention provides a method for storing, by a file system, metadata, the method including: allocating a block to be stored with information to be written; creating a segment summary information (SS) record for an allocated block and a segment usage information (SU) record for a segment where blocks in which the segment summary information record is created are positioned; and making at least any one of the segment summary information SS record and the segment usage information SU record be included in a checkpoint record to write at least any one of the segment summary information record and the segment usage information record in a previously allocated position.

According to exemplary embodiments of the present invention, write performance of a file system can be improved by decreasing the number of write times required to make a file system be in a consistent state.

BRIEF DESCRIPTION OF THE DRAWINGS

FIG. 1 is a diagram illustrating a structure of a storage space according to an exemplary embodiment of the present invention.

FIG. 2A is a diagram illustrating a structure of an entry of segment summary information (SS) for each block according to an exemplary embodiment of the present invention.

FIG. 2B is a diagram illustrating a shape in which SS entries of FIG. 2A are configured in a table form.

FIG. 3A is a diagram illustrating a structure of an entry of segment usage information (SU) according to an exemplary embodiment of the present invention.

FIG. 3B is a diagram illustrating a shape in which SU entries of FIG. 3A are configured in the table form.

FIG. 4A is a diagram illustrating a structure of a checkpoint record according to an exemplary embodiment of the present invention.

FIGS. 4B and 4C are diagrams illustrating structures of an SS record and an SU record included in an SS/SU record list of a checkpoint record, respectively.

FIG. 5 is a flowchart for describing a process in which a file system writes the checkpoint record.

Figure 6:
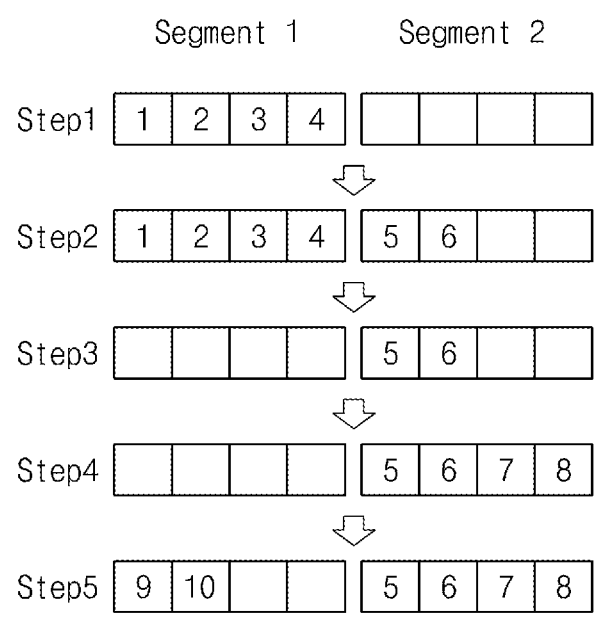
FIGS. 6 and 7 are diagrams for describing a method for writing the checkpoint record by using a plurality of checkpoint segments.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Therefore, configurations illustrated in the embodiments and the drawings described in the present specification are only the most preferred embodiment of the present invention and do not represent all of the technical spirit of the present invention, and thus it is to be understood that various equivalents and modified examples, which may replace the configurations, are possible when filing the present application.

FIG. 1 is a diagram illustrating a structure of a storage space according to an exemplary embodiment of the present invention.

A file system according to the exemplary embodiment of the present invention stores data and metadata corresponding to the data in a storage space. In this case, the metadata includes inode information and checkpoint information, and includes segment summary information (SS) and segment usage information (SU) for garbage collection.

The storage space is divided into segments and each segment is divided into block. In this case, the size of the segment/block preferably fits for the size of an erase block/page of a flash memory. For example, in the case of a large block NAND flash memory in which the page size is 2 KB and the erase block size is 128 KB, the block size may be set to 2 KB and the segment size may be set to 128 KB.

The inode information in the metadata is information for accessing an inode representing a file, and any of inode information used in a file system in the related art may be used as the inode information. For example, as the inode information in the exemplary embodiment, any of an inode map of a sprite LFS and NAT of F2FS or IFILE of an NILFS2 may be used.

FIG. 2A is a diagram illustrating a structure of an entry of segment summary information (SS) for each block according to an exemplary embodiment of the present invention. FIG. 2B is a diagram illustrating a shape in which SS entries of FIG. 2A are configured in a table (SS table) form.

The segment summary information (SS) includes an SS entry for each block which exists for each block in the segment. The SS entry for each block includes an inode number and a file block number. In this case, the file number is information that represents which part of the file a corresponding block constitutes, for example, what sequence of block in the file the corresponding block is. That is, the file block number does not represent No. of each of the blocks constituting the segment. The SS entries for each block are gathered to constitute in a table as illustrated in FIG. 2B, in the case of the segment summary information (SS). In this case, indexes representing sequences in the table correspond to block numbers. Accordingly, the SS entry in the exemplary embodiment does not separately include the block number.

FIG. 3A is a diagram illustrating a structure of an entry of segment usage information (SU) according to an exemplary embodiment of the present invention and FIG. 3B is a diagram illustrating a shape in which SU entries of FIG. 3A are configured in the table (SU table) form.

The segment usage information (SU) includes an SU entry which exists for each segment. The SU entry includes information on the number of valid blocks in the segment and information on a time when information is last written in the segment. In this case, the number of valid blocks in the segment literally represents the number of valid blocks in the segment. For example, if a predetermined file is changed and an old block becomes thus invalid, a field value (the number of valid blocks in the segment) of a segment including the corresponding block is decreased. In the case of the segment usage information, the SU entries are gathered to constitute a table as illustrated in FIG. 3B. In this case, indexes representing sequences in the table correspond to segment numbers. Accordingly, the SU entry in the exemplary embodiment does not separately include the segment number.

FIG. 4A is a diagram illustrating a structure of a checkpoint record according to an exemplary embodiment of the present invention. FIGS. 4B and 4C are diagrams illustrating structures of an SS record and an SU record included in an SS/SU record list of a checkpoint record, respectively.

A write unit of the checkpoint is the checkpoint record and a storage space for storing one checkpoint record occupies one block. Each checkpoint record includes checkpoint information and the SS/SU record list.

The checkpoint information includes a checkpoint write time or version information (for example, a version number)

so as to distinguish which record is latest. The version number is a counter which increases one by one every write.

The SS/SU record list is information SS records and SU records are stored and listed one by one in the order to reach a list. In this case, the SS record includes a record type, a block number, an inode number, and a file block number as illustrated in FIG. 4B and the SU record includes the record type, the segment number, the number of valid blocks in the segment, and a segment write time as illustrated in FIG. 4C. That is, the SS record has a structure in which the record type and the block number are added to the SS entry of FIG. 2A and the SU record has a structure in which the record type and the segment number are added to the SU entry of FIG. 3A. The record type is information for distinguishing the SS record and the SU record. Therefore, when both the SS record and the SU record are included in the SS/SU record list field, information on the record type is required, but when only any one of the SS record or the SU record is included, the information on the record type is not required.

FIG. 5 is a flowchart for describing a process in which a file system writes the checkpoint record.

When data to be written according to an input/output (I/O) request of a user application program is generated, a separate process in an operating system requests the file system to write the corresponding data in a storage device (step 402).

The file system determines a storing position in which the corresponding data will be stored according to the request from the process (step 404). That is, the file system allocates the block number.

When the block number is allocated, the file system creates the SS record as illustrated in FIG. 4B (step 406) and thereafter, adds the created SS record to the end of a temporary SS/SU record list (step 408).

Next, the file system determines a segment at which the blocks in which the SS record is created are positioned to create the SU record as illustrated in FIG. 4C (step 410) and thereafter, add the created SU record to the end of the temporary SS/SU record list (step 412).

Blocks where the SS record and the SU record are created are written in the storage device.

Next, when a situation occurs, in which the checkpoint needs to be written such as a situation in which the user application program calls a sync( ) system call (step 414), the file system verifies the size of the temporary SS/SU record list and the size of a space (a residual space other than the checkpoint information in the block size) usable as the SS/SU record list in the checkpoint record to verify whether to write all records in the temporary SS/SU record list in the checkpoint record (step 416).

In step 416, when the space usable as the SS/SU record list is larger than the size of the temporary SS/SU record list, the file system makes all of the records in the temporary SS/SU record list be included in the checkpoint record (step 418).

However, in step 416, when the space usable as the SS/SU record list is not larger than the size of the temporary SS/SU record list, the file system removes a part as large as an amount which cannot be written, that is, an amount which cannot be included in the checkpoint record, from a fore part to directly reflect the removed part to the segment summary information (SS) and the segment usage information (SU) and makes the residual part be included in the checkpoint record (step 420).

Next, the file system writes a version number or a current time (write time) in the checkpoint information field of the checkpoint record (step 422).

Next, the file system writes the checkpoint record at an allocated position (step 424) and thereafter, initializes the temporary SS/SU record list (step 426).

Figure 7:
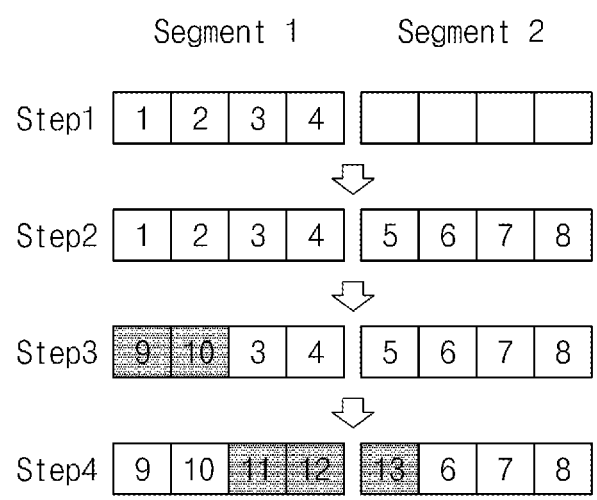

FIGS. 6 and 7 are diagrams for describing a method for writing the checkpoint record by using a plurality of checkpoint segments.

The file system is capable of using two or more segments as the checkpoint storage space. That is, since the checkpoint is very important information for mounting the file system, the file system allows the checkpoint information to be written in two or more NAND flash memory erase blocks to use a checkpoint written in another erase block even though a problem occurs in one erase block.

The segment used to store the checkpoint record is referred to as a checkpoint segment. The checkpoint record which is a checkpoint write unit occupies one block. In the file system, the checkpoint record is written sequentially from a first block of a checkpoint segment selected whenever writing the checkpoint is required. In this case, the version number (a counter which increases one by one in every writing) or the checkpoint write time is unconditionally included in each checkpoint record so as to distinguish which record is the latest record.

However, since a space reserved for the checkpoint segment is limited, a usable space may be exhausted while being used. Therefore, the file system needs to erase an old-version checkpoint record. However, when the old-version record is just erased, changed contents for the SS record and the SU record are lost. Therefore, the file system reflects the contents of the SS record and the SU record included in the corresponding checkpoint record to the segment summary information (SS) of FIG. 2B and the segment usage information (SU) of FIG. 3B, respectively before erasing the old-version record.

Two methods to be described below may be used as a method in which the file system erases (removes) the old-version record.

FIG. 6 is a diagram for describing a method for erasing an old-version checkpoint record according to an exemplary embodiment of the present invention.

When the blocks in the checkpoint segment which is used are exhausted, the file system starts writing in another segment. In this case, the file system vacates all segments which were previously used before blocks in the checkpoint segment in which new writing start to be exhausted.

For example, as illustrated in FIG. 6, when two segments are used to store the checkpoint record and each segment is constituted by four blocks, the file system starts writing in a second segment (segment 2) when all blocks in a first segment (segment 1) are exhausted. In this case, in FIG. 6, figures in a box (block) represent the version numbers.

The file system vacates the entire first segment before all blocks in the second segment are exhausted and thereafter, when second segment is full with the blocks, the file system starts writing in the first segment again.

Similarly, the file system erases all of the segments again before all of the blocks in the first segment are exhausted.

FIG. 7 is a diagram for describing a method for erasing an old-version checkpoint record according to another exemplary embodiment of the present invention.

The exemplary embodiment of FIG. 7 describes a method in which all of the records of the segment which were previously used are not erased in advance unlike the method described in the exemplary embodiment of FIG. 6, but overwriting is performed sequentially from older records. That is, the file system first starts overwriting on the oldest record first of all from the first segment when the blocks are full even in the second segment. The exemplary embodiment is a method used only when FTL exists in a lower layer in the file system because the overwriting is performed.

Figure 8:
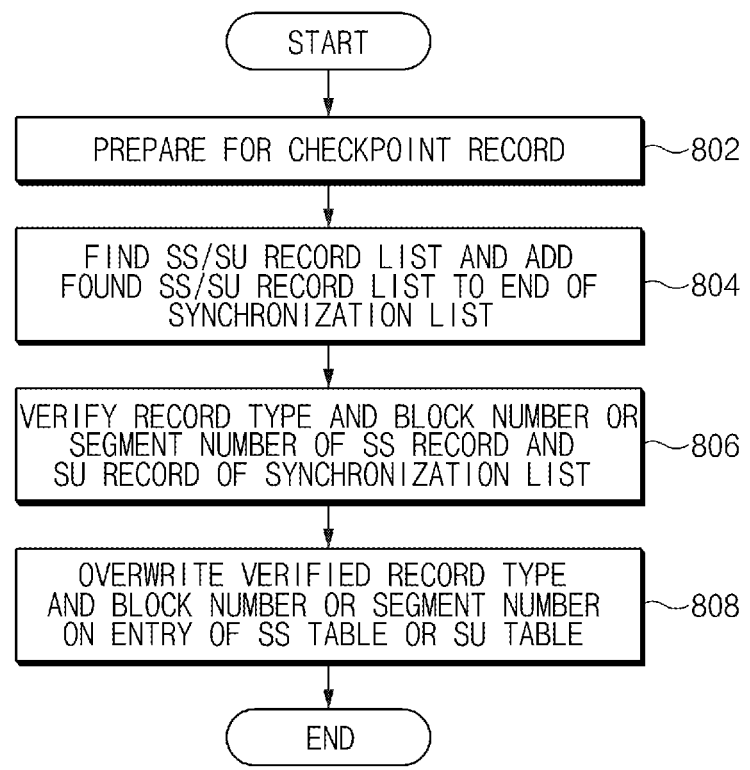
FIG. 8 is a flowchart for describing a process of reflecting an SS record and an SU record included in a checkpoint record to be erased to segment summary information and segment usage information when erasing a checkpoint record of an old version.

FIG. 8 is a flowchart for describing a process of reflecting an SS record and an SU record included in a check point to be deleted to the segment summary information (SS) and the segment usage information (SU) when erasing the old-version checkpoint record as illustrated in FIG. 6 or 7.

The following steps are performed sequentially from checkpoint records earlier written based on a writing order of checkpoint records to be erased, for example, the version number or the write time in the record.

First, the file system prepares for each checkpoint record (step 802). To this end, if the file system separately stores the checkpoint record on a memory after writing the checkpoint record while writing the checkpoint record, the file system brings the corresponding checkpoint record and if not, the file system reads the corresponding checkpoint record from the storage device.

Next, the file system adds the SS record and the SU record in the SS/SU record list field of each checkpoint record to the end of a synchronization list (step 804).

Next, the file system verifies the record type and the block number or the segment number included in the SS record or the SU record sequentially from a fore part of the synchronization list (step 806).

That is, the file system verifies the record type and the block number when the corresponding record is the SS record and verifies the record type and the segment number when the corresponding record is the SU record. Therefore, the file system may find what order of entry the corresponding SS record or SU record is for on the table of FIG. 2B or 3B.

Next, the file system overwrites entry information contained in a record to a corresponding entry in the SS table or SU table according to block number or segment number of the record (step 808).

For example, when the corresponding record is the SS record, the file system overwrites the inode number and the file block number of the SS record on the inode number and the file block number corresponding to the corresponding block number (the block number verified in step 806) in the SS table of FIG. 2B.

EXAMPLE 1

When the aforementioned exemplary embodiment of the present invention is applied to the log-structured file system (LFS) having the inode information, the checkpoint information, the segment summary information, and the segment usage information, an operating method will be described below based on a brief scenario.

Figure 9:
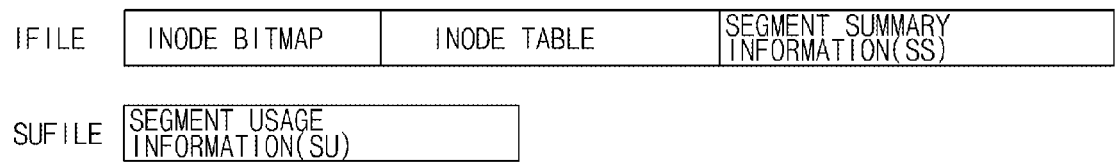
FIG. 9 is a diagram illustrating a structure of a metadata file in an NILFS2 file system as an exemplary embodiment of the present invention.

In this case, a target environment and a structure of a virtual LFS will be described below.
 Storage device: NAND flash memory (with no FTL)
 File index: Inode pointer structure
 Inode information: Inode table/bitmap
 Overall metadata configuration: Metadata is included in a file like NILFS2 and a metadata file is used while being divided into two files of IFILE and SUFILE as illustrated in FIG. 9

Figure 10:
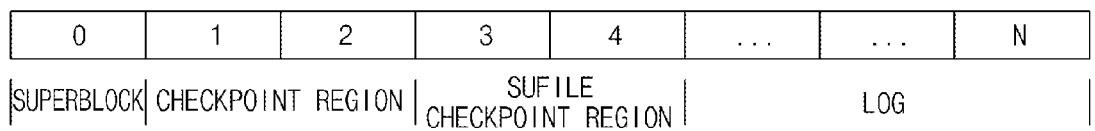
FIG. 10 is a diagram illustrating a structure of a storage space in the NILFS2 file system as an exemplary embodiment of the present invention.

The storage space is divided as illustrated in FIG. 10 and the number in the box represents the segment number.

In this case, a superblock is a region storing information on a checkpoint region, information on a SUFILE inode region, and information (a position where a log region starts) on the log region and a region containing important information which is written in formatting the file system but is not used normally. One segment is allocated to the superblock.

The checkpoint region is a region used as the checkpoint segment in the present invention. Since the metadata is stored as the file, the inode for IFILE is included in the checkpoint information of the checkpoint record. Two segments are allocated to the checkpoint region.

The SUFILE checkpoint region is a region in which a checkpoint for SUFILE is written. In Example 1, since the segment usage information is separated from IFILE to be created as a separate file, SUFILE also requires the checkpoint. When the version number or written time is included in the inode itself of SUFILE, the inode including the version number or written time just becomes the checkpoint record of SUFILE. This region is also operated according to a checkpoint storage space operating scheme. Two segments are allocated to the SUFILE checkpoint region.

A log as a space in which blocks constituting the metadata file and a general file are written includes a residual space other than spaces used in three previous regions (the superblock, the checkpoint region, and the SUFILE checkpoint region).

Hereinbelow, a case in which only the segment usage information (SU) is included in the checkpoint record is described for easy description and it is assumed that the segment is constituted by four blocks. A situation is assumed, in which formatting the file system is completed and the storage space is divided as illustrated in FIG. 10 and the metadata file has already been written in the log and thereafter, general files are normally written. A case in which contents of files which have already existed are partially changed under such a situation will be described.

Step 1.

Figure 11A:
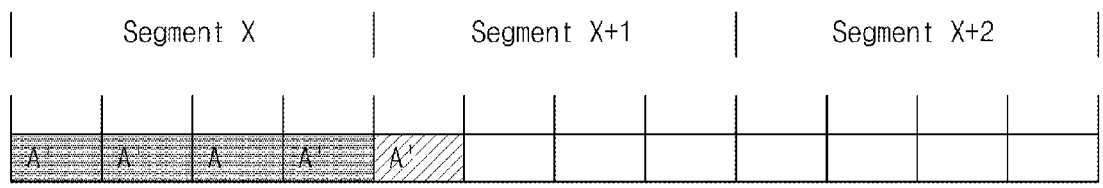
FIG. 11A to 11D are diagrams illustrating a metadata synchronization process according to an exemplary embodiment of the present invention.

When a request is received to write changes for file A to the storage device, four data blocks and one index block need to be correspondingly written as illustrated in FIG. 11A. In FIG. 11A, a block marked by dots among blocks written with A' represents the data block and a block marked by a unidirectional slash represents the index block.

As a result, four changes for the segment summary information (SS) and a change for inode A are generated, but the file system first writes the generated changes on only the memory.

Step 2.

Figure 11B:
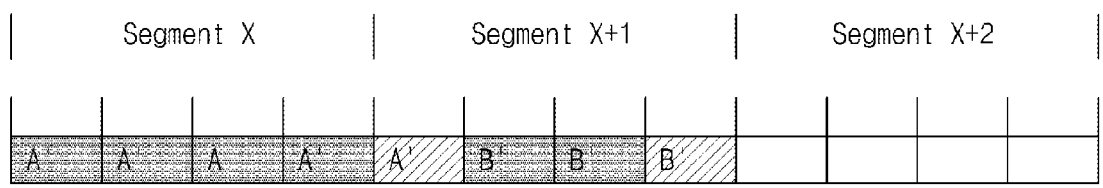

Next, when a request is received to write changes for file B to the storage device, two data blocks and one index block need to be correspondingly written as illustrated in FIG. 11B. In FIG. 11B, a block marked by dots among blocks written with B' represents the data block and a block marked by the unidirectional slash represents the index block.

As a result, two changes for the segment summary information (SS) and a change for inode B are generated, but the file system first writes the generated changes on only the memory similarly.

Step 3.

Figure 11C:
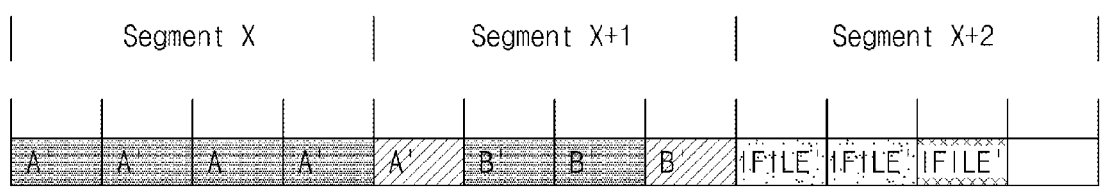

When an entire synchronization request for maintaining consistency of the file system is received, the file system uses two blocks of IFILE in order to reflect two inode change details for files A and B which occur in advance to the inode table of IFILE as illustrated in FIG. 11C. One block of IFILE is used to reflect eight change details for the segment summary information (SS) which occur in advance to the segment summary information (SS) part of IFILE.

In Segment X+2 of FIG. 11C, first and second block represent an inode table change and a third block represents a segment usage information change.

Two SU records of the temporary SU record list are inserted into the checkpoint record to be stored upon writing the checkpoint. To this end, a change occurs in the checkpoint region as illustrated in FIG. 11D.

Figure 11D:
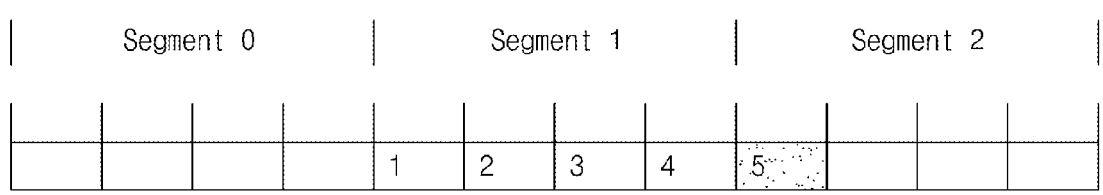

In FIG. 11D, No. 5 represents the version number and a No. 5 version checkpoint record is written in the corresponding block.

In Example 1, a total of four blocks are used to synchronize metadata while performing steps 1 to 3. If the present invention is not applied to the change of the segment usage information (SU), one block is consumed to reflect the change of the segment usage information (SU) to SUFILE and one block needs to be also used in segment No. 3 and 4 in order to store the SUFILE inode, two blocks will be further written. Specific application programs frequently make such a synchronization request and by repeated requests, there will be a large difference in writing performance between a case in which the present invention is applied and a case in which the present invention is not applied.

EXAMPLE 2

Example 1 shows what occurs when applying the present invention to the situation in which the NAND flash memory with no FTL is used. The example (Example 2) shows an example in which a case in which a NAND flash memory has the FTL is proposed to another proposed virtual LFS.

When the FTL exists, overwriting is possible, and as a result, a metadata configuring and writing scheme is different from that created for the case in which the NAND flash memory with no FTL is used as described in Example 1. An object of Example 2 is to show that an improvement effect is achieved by applying the present invention even to such a case.

In this case, the target environment and the structure of the virtual LFS in Example 2 will be described below.
  Storage device: eMMC or SD card (a NAND flash memory based storage device with the FTL)
  File index: Inode pointer structure
  Inode information: Inode map (a scheme used in the Sprite LFS)
  Overall metadata configuration: Since overwriting is possible by the FTL, the metadata is not handled as the file and instead, a storage position is designated for each metadata item and the change is overwritten on the storage position.

Figure 12:
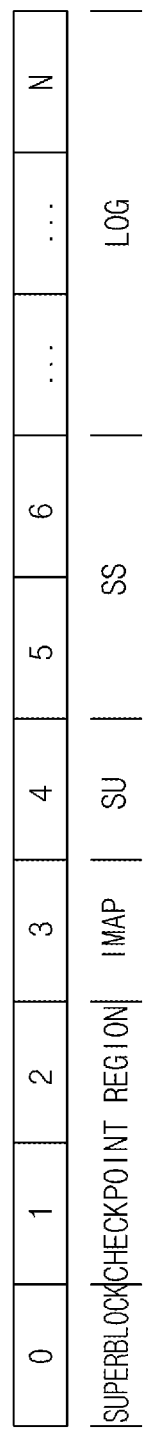
FIG. 12 is a diagram illustrating a structure of a storage space in an F2FS file system as another exemplary embodiment of the present invention.

The storage space is divided as illustrated in FIG. 12 and the number in the box represents the segment number.

In this case, the superblock is a region including important information such as positions where respective metadata items (checkpoint, IMAP, SU, and SS) are stored. One segment is allocated to the superblock.

The checkpoint region is a region used as the checkpoint segment in the present invention. Since two or more segments are required to use a method for operating the checkpoint storage space according to the present invention, two segments are allocated in Example 2.

The IMAP region as a region storing the inode map and the position of each inode is written in the table form.

The SU region is a region storing the segment usage information. Since one table entry exists for each segment, a size required to store the segment usage information varies in proportion to the size of the entire storage space, but in Example 2, it is assumed that only one segment is required for easy description.

The SS region is a region storing the segment summary information. It is assumed that similarly as the SU region, a required size varies in proportion to the size of the entire storage space, but only two segments are required for easy description.

The log region as a space in which not the metadata but the general data are written uses a residual space which remains after being used for the metadata.

Even in the following description, as described in Example 1, the case in which only the segment usage information (SU) is included in the checkpoint record is described for easy description and it is assumed that the segment is constituted by four blocks.

Step 1.

Figure 13A:
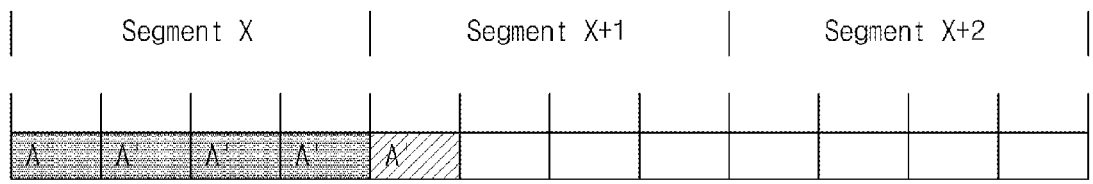
FIG. 13A to 13E are diagrams illustrating a metadata synchronization process according to another exemplary embodiment of the present invention.

When a request is received to write changes for file A to the storage device, four data blocks and one index block need to be correspondingly used as illustrated in FIG. 13A. In FIG. 13A, a block marked by dots among blocks written with A' represents the data block and a block marked by the unidirectional slash represents the index block.

As a result, four changes for the segment summary information (SS) and a change for inode A are generated, but the file system first writes the generated changes on only the memory.

Step 2.

Figure 13B:
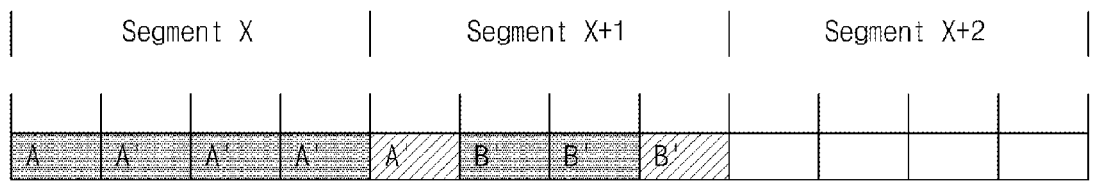

Next, when a request is received to write changes for file B to the storage device, two data blocks and one index block need to be correspondingly used as illustrated in FIG. 13B. In FIG. 13B, a block marked by dots among blocks written with B' represents the data block and a block marked by the unidirectional slash represents the index block.

As a result, two changes for the segment summary information (SS) and a change for inode B are generated, but the file system first writes the generated changes on only the memory similarly.

Step 3.

Figure 13C:
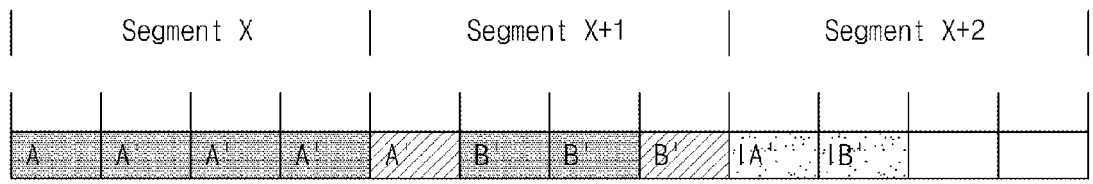

When an entire synchronization request for maintaining the consistency of the file system is received, the file system needs to allocate one block to each of new inodes of two files A and B changed in previous steps 1 and 2 and write the allocated inodes in the log. The correspondingly changed log shape is illustrated in FIG. 13C. In FIG. 13C, IA' represents a new inode of file A and IB' represents a new inode of file B.

Figure 13D:
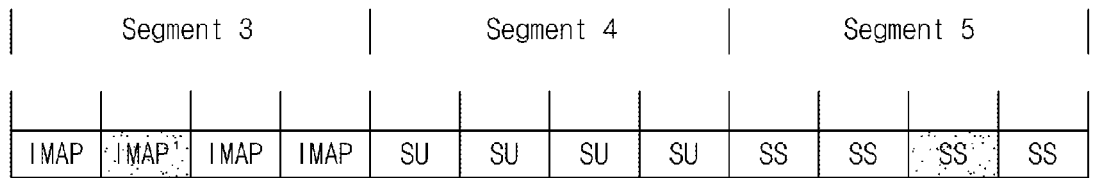

Next, the file system reflects positions of new inodes IA' and IB' which are changed to the inode map and reflects eight change details for the SS which are written only on the memory in steps 1 and 2 to the SS region of FIG. 12. To this end, one block of segment No. 3 where the inode map is positioned is changed as illustrated in FIG. 13D and one block of segment No. 5 where the SS is positioned is changed.

Figure 13E:
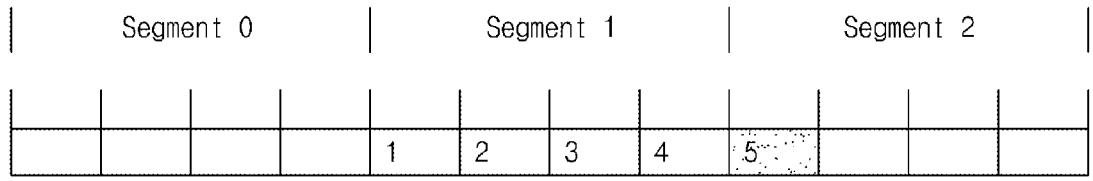

Next, the file system inserts the SU records of the temporary SU record list into the checkpoint record to store the SU records upon writing the checkpoint. To this end, one block is written in the checkpoint region as illustrated in FIG. 13E.

In Step 3 of the example, when the present invention is not applied, the file system needs to additionally write at least one of blocks positioned in 'segment No. 4' which is the SU storage region in order to reflect the SU change. If a position where the SU change for the contents performed in steps 1 and 2 needs to be written corresponds to a plurality of blocks, writing associated with the respective blocks needs to be performed.

The content of the present invention will be summarized below in brief.

In the log-structured file system in which the metadata is constituted by four items, that is, the inode information, the checkpoint information, the segment summary information, and the segment usage information, although the size of a modified matter for each item is small when synchronizing the metadata, four items need to be separately written, and as a result, writing needs to be performed at least four times. However, the checkpoint information required for restoring the consistency of the file system has a smaller size than a general block (which generally fits for multiple times larger than the page size of the flash memory). Accordingly, in the present invention, the changes of the segment summary information and the segment usage information are 'made into an identifiable record' to be included in a residual space of the checkpoint record to reduce the number of writing times required for synchronization.

Figure 14:
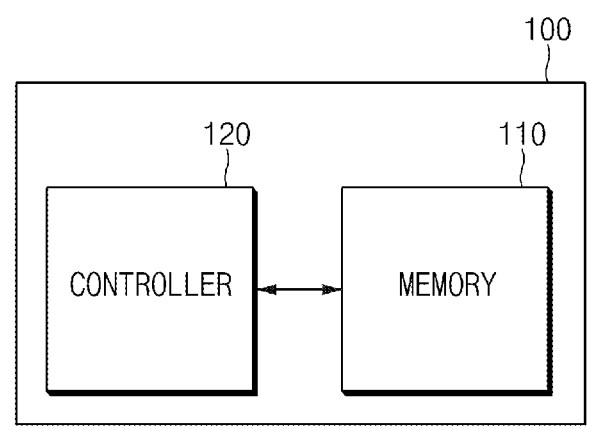
FIG. 14 is a diagram illustrating a file management system according to an exemplary embodiment of the present invention.

FIG. 14 is a diagram illustrating a file management system according to an exemplary embodiment of the present invention.

A file management system 100 includes a memory 110 and a controller 120.

The memory 110 may include the storage space illustrated in FIG. 1. The memory 110 may include a non-volatile storage media.

The controller 120 performs the functions of the file system according to the exemplary embodiment of the present invention. That is, the controller 120 stores data and metadata corresponding to the data in the storage space of the memory 110.

The controller 120 may be a processor of a computer system. The processor may execute processing instructions stored in a storage device and store the data and the metadata in the memory 110.

The exemplary embodiments of the present invention are illustrative only, and various modifications, changes, substitutions, and additions may be made without departing from the technical spirit and scope of the appended claims by those skilled in the art, and it will be appreciated that the modifications and changes are included in the appended claims.

What is claimed is:

1. A method for storing, by a file system, data in a flash memory, the method comprising:
    allocating a block to be stored with information to be written;
    creating a segment summary information (SS) record for the allocated block to write the created SS record in a temporary list;
    creating a segment usage information (SU) record for a segment where blocks in which the SS record is created are positioned to write the created SU record in the temporary list;
    including at least one of the SS record and the SU record written in the temporary list in a checkpoint record; and
    writing the checkpoint record in an allocated position,
    wherein including the at least one of the SS record and the SU record written in the temporary list in the checkpoint record includes:
        verifying the size of the temporary list and the size of a prereserved space in the checkpoint record; and
        when a usable space in the file system is smaller than the size of the temporary list, removing a part of the file system that is as large as an amount which cannot be written, that is, an amount which cannot be included in the checkpoint record, from a fore part to directly reflect the removed part to the SS record and the SU record, and including the residual part in the checkpoint record.

2. The method of claim 1, wherein the SS record includes an inode number and a file block number.

3. The method of claim 2, wherein the file block number is a number that represents which part of the file system the corresponding block constitutes.

4. The method of claim 1, wherein the SU record includes information on a number of valid blocks in the corresponding segment and the time when the checkpoint record is last written in the corresponding segment.

5. The method of claim 1, further comprising:
    before writing the checkpoint record in the allocated position, writing checkpoint information in the checkpoint record.

6. The method of claim 5, wherein the checkpoint information includes version information or a checkpoint write time.

7. The method of claim 1, wherein writing the checkpoint record in the allocated position includes writing the checkpoint record sequentially from a first block of a predetermined checkpoint segment.

8. The method of claim 7, wherein writing the checkpoint record in the allocated position includes:
    sequentially writing the checkpoint record in a first checkpoint segment;
    sequentially writing the checkpoint record in a second checkpoint segment when all of the first checkpoint segments are used;
    erasing all checkpoint records written in the first checkpoint segment before all of the second checkpoint segments are used; and
    rewriting the checkpoint record in the first checkpoint segment when all of the second checkpoint segments are used.

9. The method of claim 8, wherein before all of the checkpoint records written in the first checkpoint segment are erased, contents of an SS record and an SU record included in a checkpoint record to be erased are reflected to prestored SS and prestored SU.

10. The method of claim 7, wherein writing the checkpoint record in the allocated position includes:
    sequentially writing the checkpoint records in the first checkpoint segment;
    sequentially writing the checkpoint records in the second checkpoint segment when all of the first checkpoint segments are used; and
    overwriting a checkpoint record which is written earliest in the first checkpoint segment on a checkpoint record to be newly written when all of the second checkpoint segments are used.

11. The method of claim 10, wherein before overwriting the checkpoint record, contents of an SS record and an SU record included in a checkpoint record to be erased are reflected to prestored SS and prestored SU.

12. A method for storing, by a file system, metadata in a flash memory, the method comprising:
    allocating a block to be stored with information to be written;
    creating a segment summary information (SS) record for the allocated block and a segment usage information (SU) record for a segment where blocks in which the SS record is created are positioned; and
    including at least one of the SS record and the SU record in a temporary list in a checkpoint record by writing at least one of the SS record and the SU record in a previously allocated position, wherein including the at least one of the SS record and the SU record written in the temporary list in the checkpoint record includes:

verifying the size of the temporary list and the size of the previously allocated position in the checkpoint record; and when a usable space in the file system is smaller than the size of the temporary list, removing a part of the file system that is as large as an amount which cannot be written, that is, an amount which cannot be included in the checkpoint record, from a fore part to directly reflect the removed part to the SS record and the SU record, and including the residual part in the checkpoint record.

13. The method of claim 12, wherein the SS record includes an inode number and a file block number.

14. The method of claim 12, wherein the SU record includes information on a number of valid blocks in the corresponding segment and the time when the information is last written in the corresponding segment.

15. The method of claim 12, further comprising:
before writing at least one of the SS record and the SU record in the previously allocated position,
writing checkpoint information in the checkpoint record.

16. The method of claim 15, wherein the checkpoint information includes version information or a checkpoint write time.

17. A method for storing, by a file system, data in a flash memory, the method comprising:

allocating a block to be stored with information to be written;

creating a segment summary information (SS) record for the allocated block to write the created SS record in a temporary list;

creating a segment usage information (SU) record for a segment where blocks in which the SS record is created are positioned to write the created SU record in the temporary list;

including at least one of the SS record and the SU record written in the temporary list in a checkpoint record; and writing the checkpoint record in an allocated position, wherein writing the checkpoint record in the allocated position includes writing the checkpoint record sequentially from a first block of a predetermined checkpoint segment, and wherein writing the checkpoint record in the allocated position includes:

sequentially writing the checkpoint record in a first checkpoint segment;

sequentially writing the checkpoint record in a second checkpoint segment when all of the first checkpoint segments are used;

overwriting a checkpoint record, which is written earliest in the first checkpoint segment on a checkpoint record, to be newly written when all of the second checkpoint segments are used.

18. The method of claim 17, wherein before overwriting the checkpoint record, contents of a SS record and a SU record included in a checkpoint record to be erased are reflected to prestored SS and prestored SU.

* * * * *